US010801116B2

(12) United States Patent
Yachi

(10) Patent No.: US 10,801,116 B2
(45) Date of Patent: Oct. 13, 2020

(54) HYDROGEN-OXYGEN REACTION DEVICE

(71) Applicant: IHI Corporation, Koto-ku (JP)

(72) Inventor: Yusaku Yachi, Koto-ku (JP)

(73) Assignee: IHI Corporation, Koto-ku (JP)

( * ) Notice: Subject to any disclaimer, the term of this patent is extended or adjusted under 35 U.S.C. 154(b) by 0 days.

(21) Appl. No.: 16/628,087

(22) PCT Filed: Jan. 10, 2018

(86) PCT No.: PCT/JP2018/000313
§ 371 (c)(1),
(2) Date: Jan. 2, 2020

(87) PCT Pub. No.: WO2019/008799
PCT Pub. Date: Jan. 10, 2019

(65) Prior Publication Data
US 2020/0173035 A1    Jun. 4, 2020

(30) Foreign Application Priority Data

Jul. 4, 2017  (JP) ................................. 2017-131199

(51) Int. Cl.
*C25B 1/04* (2006.01)
*C01B 3/00* (2006.01)
(Continued)

(52) U.S. Cl.
CPC ..................... *C25B 1/04* (2013.01)

(58) Field of Classification Search
CPC .... C01B 3/00; C01B 5/00; C25B 1/00; C25B 1/02; C25B 1/04; H01M 8/00; H01M 8/06; H01M 8/10
See application file for complete search history.

(56) References Cited

U.S. PATENT DOCUMENTS 8,637,198 B2 *  1/2014  Ishida ............... H01M 8/04007
429/421

FOREIGN PATENT DOCUMENTS

EP   0 089 830 A2   9/1983
JP   58-216720 A   12/1983
(Continued)

OTHER PUBLICATIONS

International Search Report dated Apr. 3, 2018 in PCT/JP2018/000313, citing documents AL, AM and AN therein, 1 page.

*Primary Examiner* — Natasha E Young
(74) *Attorney, Agent, or Firm* — Oblon, McClelland, Maier & Neustadt, L.L.P.

(57) ABSTRACT

This hydrogen-oxygen reaction device includes a reaction vessel including a reaction region filled with a reaction catalyst which promotes a reaction between hydrogen and oxygen, an introduction portion which introduces an hydrogen-oxygen mixed gas having hydrogen or oxygen as a main component into the reaction vessel, a water vapor pipe of which one end portion is inserted into the reaction vessel and which includes a region in contact with the reaction region with at least a part of the region in contact with the reaction region being formed of a water vapor permeable membrane, a discharge portion through which a gas in the reaction vessel is discharged to an outside, and a cooling portion which cools the water vapor pipe outside the reaction vessel.

10 Claims, 4 Drawing Sheets

(51) Int. Cl.
*C01B 5/00* (2006.01)
*H01M 8/00* (2016.01)
*H01M 8/06* (2016.01)
*H01M 8/10* (2016.01)

(56) References Cited

FOREIGN PATENT DOCUMENTS

| | | |
|---|---|---|
| JP | 3-39493 A | 2/1991 |
| JP | 2000-72405 A | 3/2000 |
| JP | 2001-146404 A | 5/2001 |
| JP | 2004-300451 A | 10/2004 |
| JP | 2006-4787 A | 1/2006 |
| JP | 2007-153670 A | 6/2007 |
| JP | 2009-143732 A | 7/2009 |
| JP | 5301265 B2 | 9/2013 |
| JP | 2015-116545 A | 6/2015 |

* cited by examiner

HYDROGEN-OXYGEN REACTION DEVICE

TECHNICAL FIELD

The present disclosure relates to a hydrogen-oxygen reaction device.

BACKGROUND ART

In a water electrolysis device, water is supplied to one surface side of an electrode membrane having catalyst layers provided on both surfaces and then energized using an external power source, and thus the water decomposes and generates oxygen and hydrogen (for example, refer to Patent Literature 1). Oxygen and hydrogen are respectively generated on one surface side and the other surface side of the electrode membrane and thus are individually collected and transported to a tank or the like.

CITATION LIST

Patent Literature

[Patent Literature 1] Japanese Unexamined Patent Publication No. H3-39493

SUMMARY OF INVENTION

Technical Problem

However, when oxygen or hydrogen generated in the water electrolysis device is collected, a small amount of a different kind of gas from a gas to be collected may be mixed in. In this case, the purity of the collected gas may be reduced.

The present disclosure describes providing a hydrogen-oxygen reaction device which is able to suitably remove gases which are components different from a main component from a hydrogen-oxygen mixed gas having hydrogen or oxygen as the main component.

Solution to Problem

In order to achieve the above object, a hydrogen-oxygen reaction device according to an embodiment of the present disclosure includes a reaction vessel including a reaction region filled with a reaction catalyst which promotes a reaction between hydrogen and oxygen, an introduction portion configured to introduce an hydrogen-oxygen mixed gas having hydrogen or oxygen as a main component into the reaction vessel, a water vapor pipe of which one end portion is inserted into the reaction vessel and including a region in contact with the reaction region with at least a part of the region in contact with the reaction region being formed of a water vapor permeable membrane, a discharge portion through which a gas in the reaction vessel is discharged outside, and a cooling portion configured to cool the water vapor pipe outside the reaction vessel.

Effects of Invention

According to the hydrogen-oxygen reaction device of the present disclosure, it is possible to suitably remove gases which are components different from a main component from a hydrogen-oxygen mixed gas having hydrogen or oxygen as the main component.

DESCRIPTION OF EMBODIMENTS

Figure 1:
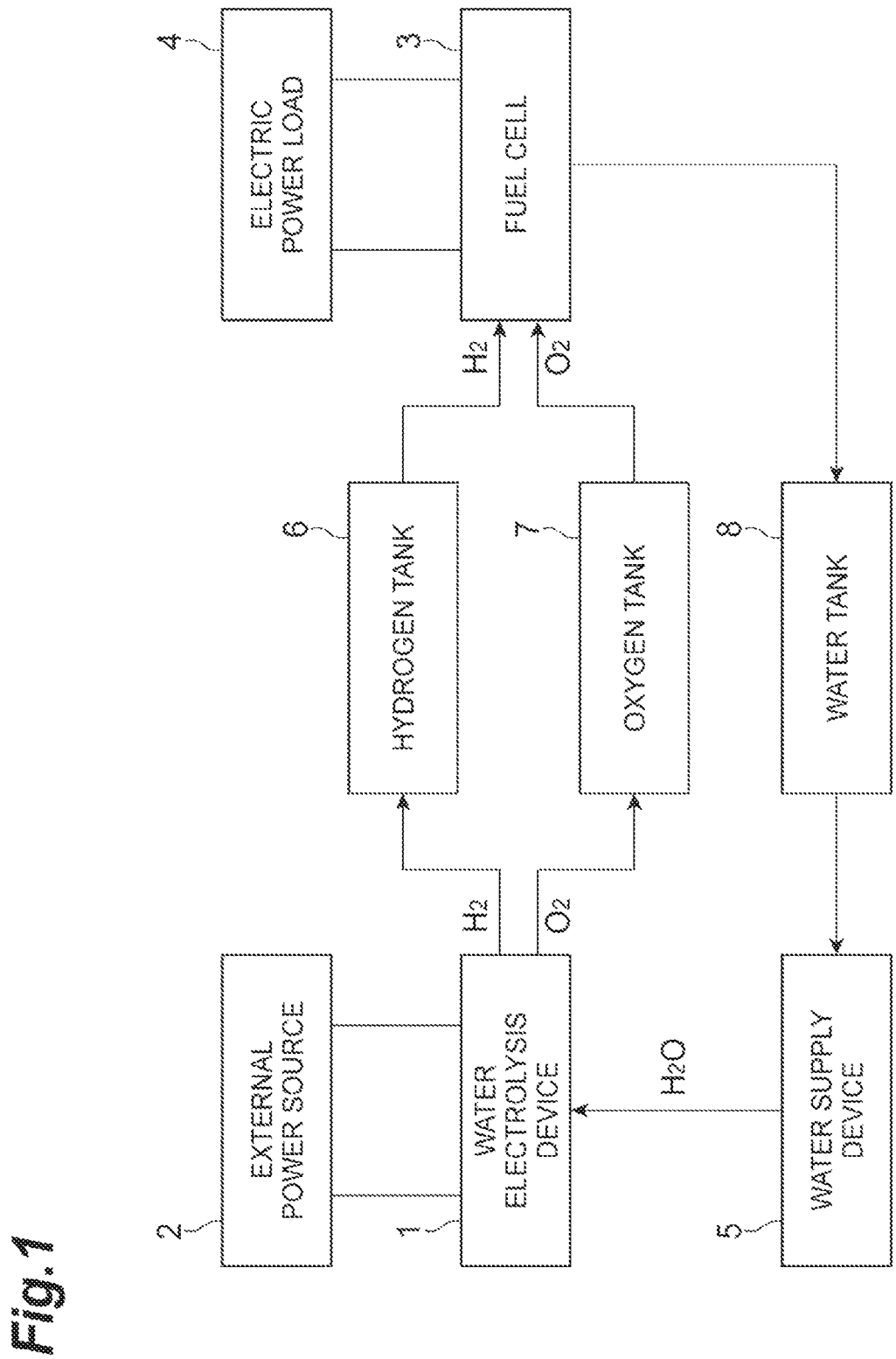
FIG. 1 is a diagram for explaining an outline of a regenerative fuel cell system to which a hydrogen-oxygen reaction device according to an embodiment of the present disclosure can be applied.

A hydrogen-oxygen reaction device according to an embodiment of the present disclosure includes a reaction vessel having a reaction region which is filled with a reaction catalyst that promotes a reaction between hydrogen and oxygen, an introduction portion which introduces an hydrogen-oxygen mixed gas having hydrogen or oxygen as a main component into the reaction vessel, a water vapor pipe of which one end portion is inserted into the reaction vessel and which includes a region that is in contact with the reaction region with at least a part of the region in contact with the reaction region being formed of a water vapor permeable membrane, a discharge portion through which a gas in the reaction vessel is discharged to the outside, and a cooling portion which cools the water vapor pipe outside the reaction vessel.

According to the above-described hydrogen-oxygen reaction device, a mixed gas of hydrogen and oxygen is introduced from an introduction portion, and water vapor is formed from hydrogen and oxygen by a reaction catalyst in the reaction region in the reaction vessel and then discharged from the discharge portion to the outside. Since a proportion of components different from the main component of hydrogen and oxygen contained in the mixed gas can be reduced by forming the water vapor in the reaction region, it is possible to remove gases which are components different from the main component from the gas in which hydrogen and oxygen are mixed. Further, in the hydrogen-oxygen reaction device, the water vapor generated in the reaction region can be discharged to the outside due to the water vapor pipe having the water vapor permeable membrane inserted into the reaction region and the cooling portion. Therefore, a reaction efficiency between hydrogen and oxygen using the reaction catalyst in the reaction region is improved. Thus, it is possible to appropriately remove gases which are components different from a main component from the hydrogen-oxygen mixed gas having hydrogen or oxygen as the main component.

The introduction portion may be provided at one end portion of the reaction region, and the discharge portion may be provided at the other end portion on the side opposite to the one end portion of the reaction region.

In this way, a gas which has passed through the reaction region can be appropriately discharged from the discharge portion by providing the introduction portion at one end portion of the reaction region and providing the discharge portion at the other end portion on the side opposite to the one end portion of the reaction region. Therefore, the gases from which the components different from the main component are appropriately removed can be discharged from the discharge portion.

A plurality of the water vapor pipes may be inserted into the reaction vessel.

As described above, when the plurality of water vapor pipes are inserted into the reaction vessel, since movement of the water vapor from the reaction region to the water vapor pipes is further promoted, the removal of the components different from the main component can be performed with higher efficiency.

The hydrogen-oxygen reaction device may include a second reaction vessel having a second reaction region which is filled with the reaction catalyst, a hydrogen selective permeable membrane provided at a boundary between the reaction vessel and the second reaction vessel, a second water vapor pipe of which one end portion is inserted into the second reaction vessel and which includes a region that is in contact with the second reaction region with at least a part of the region in contact with the second reaction region being formed of the water vapor permeable membrane, and a second discharge portion through which a gas in the second reaction vessel is discharged to the outside, and the cooling portion may cool the second water vapor pipe outside the second reaction vessel.

According to the above-described hydrogen-oxygen reaction device, since the hydrogen selective permeable membrane is provided between the reaction vessel and the second reaction vessel, and a hydrogen component of the gas in the reaction vessel moves to the second reaction vessel, a proportion of an oxygen component is increased as compared with the introduced mixed gas in the reaction vessel. Therefore, when the hydrogen-oxygen mixed gas having oxygen as the main component is introduced into the reaction vessel, a proportion of the main component is increased. When the water vapor is formed by a reaction between hydrogen and oxygen due to the reaction catalyst in the reaction region in a state in which the proportion of the oxygen component is increased as described above, the gas with a higher proportion of an oxygen component is discharged from the discharge portion. In this way, with such a configuration for the second reaction vessel, a purity of oxygen in the gas discharged from the lower discharge portion can be further increased when the hydrogen-oxygen mixed gas having oxygen as the main component is introduced into the reaction vessel.

The above-described hydrogen-oxygen reaction device may be used in a regenerative fuel cell system. Moreover, the hydrogen-oxygen reaction device may be used in a regenerative fuel cell system mounted in an aircraft.

Hereinafter, embodiments for carrying out the present disclosure will be described in detail with reference to the accompanying drawings. In the description of the drawings, the same elements are designated by the same reference numerals, and redundant description thereof will be omitted.

An outline of a regenerative fuel cell system to which the hydrogen-oxygen reaction device according to the embodiment can be applied will be described with reference to FIG. 1. The regenerative fuel cell system may be mounted in a moving body such as an aircraft. The regenerative fuel cell system is particularly suitable for an aircraft which has a limited loading capacity and requires reuse of hydrogen/oxygen. The regenerative fuel cell system includes a water electrolysis device 1 and an external power source 2 connected to the water electrolysis device 1. The water electrolysis device 1 electrolyzes water supplied from a water supply device 5 due to energization from the external power source 2 and generates hydrogen and oxygen. The regenerative fuel cell system includes a fuel cell 3 and an electric power load 4 connected to the fuel cell 3. The fuel cell 3 generates electric power using hydrogen stored in a hydrogen tank 6 and oxygen stored in an oxygen tank 7 as raw materials. The fuel cell 3 is, for example, a polymer electrolyte fuel cell (PEFC).

In the regenerative fuel cell system, while the stored fuel is enabled, electric power is generated by the fuel cell 3, and water is generated and stored in a water tank 8. After the fuel is consumed, the water stored in the water tank 8 is electrolyzed into hydrogen and oxygen in the water electrolysis device 1 using the external power source 2. The generated hydrogen and oxygen are stored in the hydrogen tank 6 and the oxygen tank 7 at a predetermined pressure and are supplied again to the fuel cell 3 to generate electric power. The regenerative fuel cell system has a high energy density and has a weight which is one-half to one-third that of other secondary batteries such as lithium ion batteries. In this way, the regenerative fuel cell system is light in weight and thus is advantageous for mounting in a moving body.

The hydrogen-oxygen reaction device according to the embodiment is provided in a subsequent stage of the water electrolysis device 1 in the regenerative fuel cell system.

Figure 2:
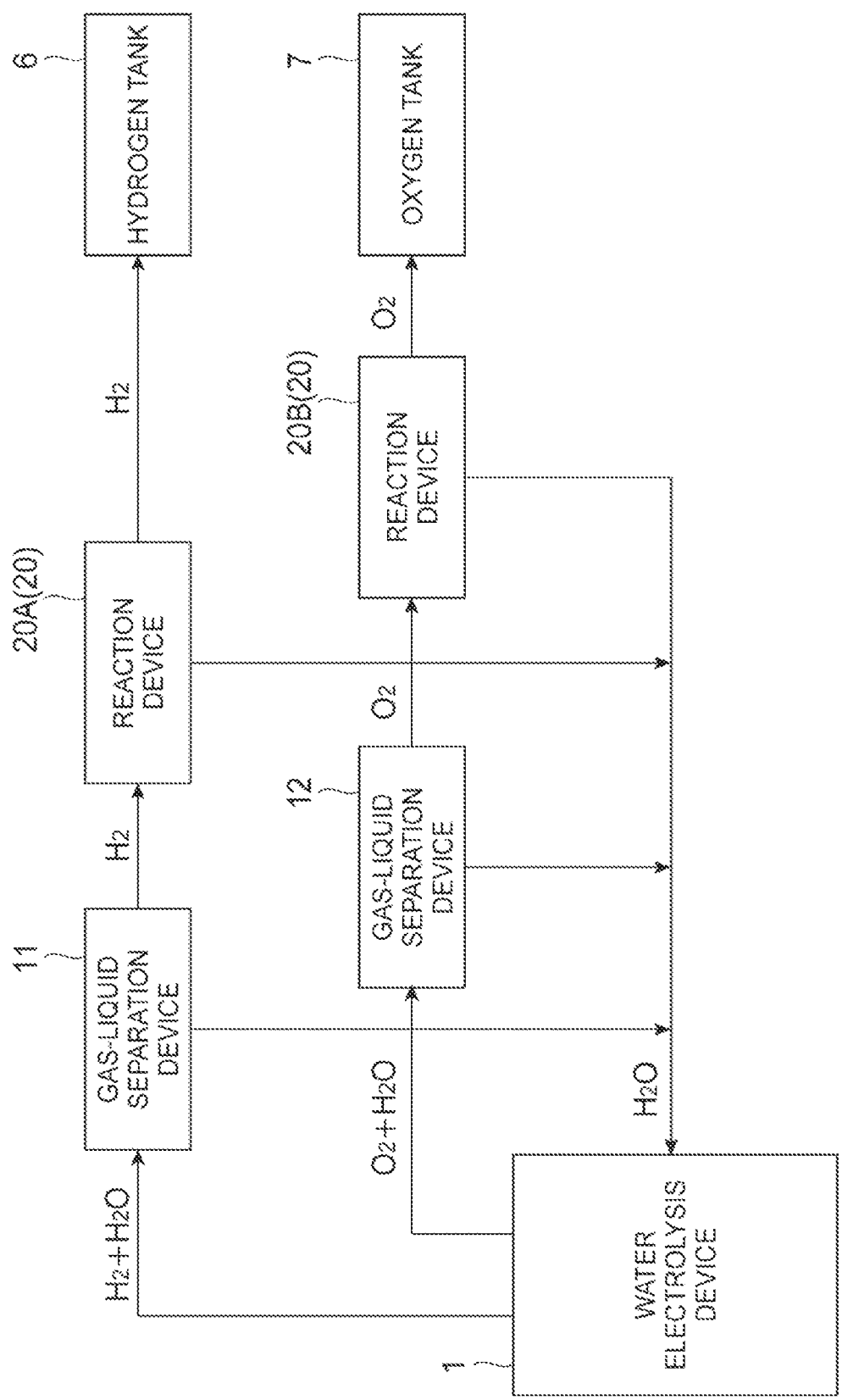
FIG. 2 is a diagram for explaining a device configuration between a water electrolysis device and a hydrogen tank/oxygen tank in the regenerative fuel cell system.

In FIG. 2, respective devices provided between the water electrolysis device 1 and the hydrogen tank 6 and the oxygen tank 7 located at the subsequent stage thereof will be described. In the water electrolysis device 1, hydrogen and oxygen are separated and collected, but a gas collected as a hydrogen gas from the water electrolysis device 1 is not a pure hydrogen gas but a mixed gas including water vapor derived from water included in the water electrolysis device 1 and some of oxygen generated in the water electrolysis device 1. Therefore, a gas-liquid separation device 11 which removes a water vapor component from a mixed gas having hydrogen from the water electrolysis device 1 as a main component, and a hydrogen-oxygen reaction device 20 (20A) which removes the oxygen component by allowing the oxygen component to react with hydrogen and producing water are provided between the water electrolysis device 1 and the hydrogen tank 6.

Similarly, a gas collected as oxygen gas from the water electrolysis device 1 includes not only oxygen but also water vapor derived from water included in the water electrolysis device 1 and some of hydrogen generated in the water electrolysis device 1. Therefore, a gas-liquid separation device 12 which removes the water vapor component from a mixed gas having oxygen from the water electrolysis device 1 as a main component, and a hydrogen-oxygen reaction device 20 (20B) which removes the oxygen component by allowing the oxygen component to react with hydrogen and producing water are provided between the water electrolysis device 1 and the oxygen tank 7.

The water vapor (water) removed in the gas-liquid separation devices 11 and 12 and the water removed in the hydrogen-oxygen reaction devices 20A and 20B are returned to the water electrolysis device 1 and used for generating hydrogen and oxygen.

As described above, the hydrogen-oxygen reaction device 20 according to the embodiment is a device which is provided in the subsequent stage of the water electrolysis device 1 and removes a gas that is not a main component from a hydrogen-oxygen mixed gas having hydrogen or oxygen as the main component. The gas having a component to be removed is oxygen in the case of a mixed gas having hydrogen as the main component and is hydrogen in the case of a mixed gas having oxygen as the main component. In addition, since the hydrogen-oxygen reaction devices 20A and 20B have the same structure, the hydrogen-oxygen reaction device 20 will be described in the following embodiment.

Figure 3:
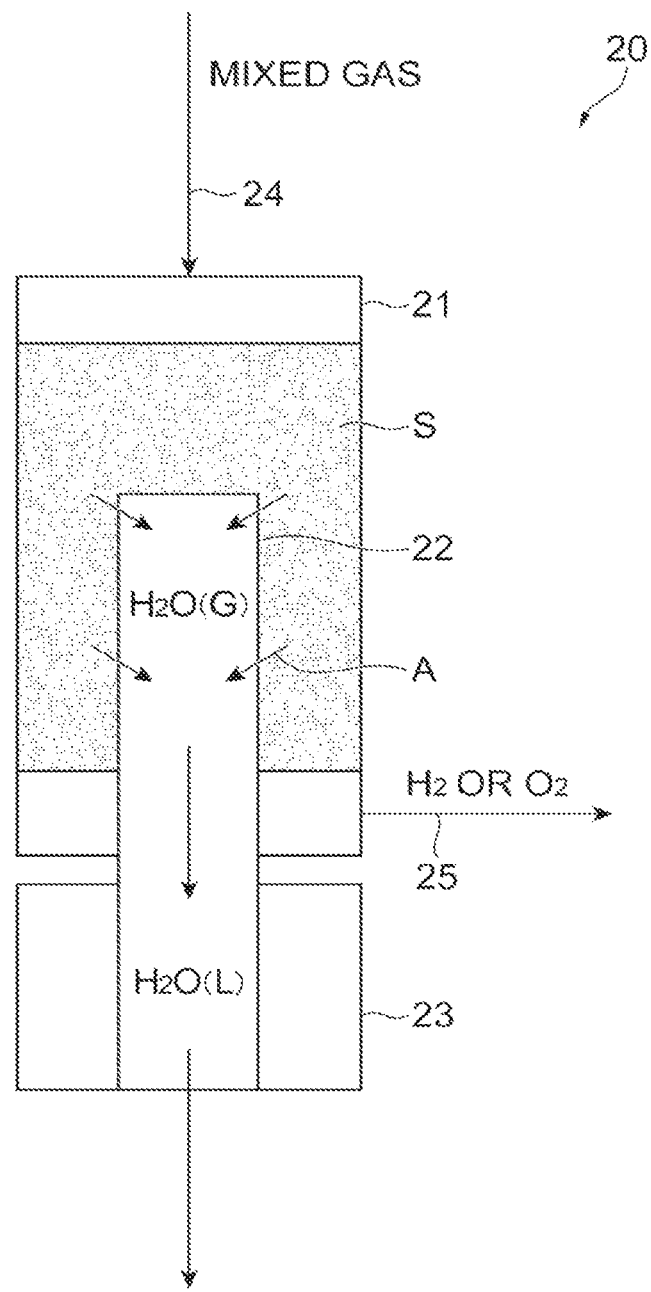
FIG. 3 is a diagram for explaining a configuration of the hydrogen-oxygen reaction device according to an embodiment.

Next, a schematic structure of the hydrogen-oxygen reaction device 20 will be described with reference to FIG. 3. As shown in FIG. 3, the hydrogen-oxygen reaction device 20 includes a reaction vessel 21 including a reaction region S filled with a reaction catalyst for hydrogen and oxygen, a water vapor pipe 22 inserted into the reaction vessel 21, a cooling portion 23 which cools the water vapor pipe 22, an introduction portion 24 which introduces a hydrogen-oxygen mixed gas having one of hydrogen and oxygen as a main component into the reaction vessel 21, and a discharge portion 25 which discharges the gas that has passed through the reaction region S.

The reaction region S in the reaction vessel 21 of the hydrogen-oxygen reaction device 20 is formed by a reaction catalyst which promotes a reaction between hydrogen and oxygen being filled thereinto. The reaction catalyst is not particularly limited as long as it is a catalyst related to the reaction between hydrogen and oxygen. For example, platinum (Pt) can be used. Further, the introduction portion 24 is mounted on an upper portion of the reaction vessel 21 and has a function of introducing the mixed gas (the hydrogen-oxygen mixed gas having one of hydrogen and oxygen as the main component) from the gas-liquid separation device (the gas-liquid separation device 11 or the gas-liquid separation device 12) into the reaction vessel 21. Furthermore, the discharge portion 25 is mounted on a lower portion of the reaction vessel 21 and has a function of discharging a gas in the reaction vessel 21 to the outside. The gas discharged from the discharge portion 25 is transported to a tank (the hydrogen tank 6 or the oxygen tank 7) located at a subsequent stage.

The water vapor pipe 22 is a pipe which passes through the reaction vessel 21 from below the reaction vessel 21 and is partially inserted into the reaction region S in the reaction vessel 21. One end portion of the water vapor pipe 22 is provided in the reaction region S. At least a part of a region of the water vapor pipe 22 which is in contact with the reaction region S is formed by a water vapor permeable membrane. The water vapor permeable membrane is a membrane which (almost) does not allow permeation of hydrogen and oxygen that are components of the mixed gas and can selectively allow permeation of water vapor. Examples of such a membrane include a moisture control tube (manufactured by SMC) and a Nafion membrane but are not limited thereto. In the region of the water vapor pipe 22 which is in contact with the reaction region S, an area occupied by the water vapor permeable membrane can be made wider. The movement of water vapor inside and outside the water vapor pipe 22 can be performed by ensuring a large area occupied by the water vapor permeable membrane. Therefore, the water vapor pipe 22 can further promote the movement of the water vapor by the region in contact with the reaction region S being made larger and the area occupied by the water vapor permeable membrane in the region being made larger.

Moreover, a region of the water vapor pipe 22 inserted into the reaction vessel 21 may be a region which is not in contact with the reaction region S, and may be formed of the water vapor permeable membrane. However, a material which does not have water vapor permeability is selected for the water vapor pipe 22 outside the reaction vessel 21. When the water vapor pipe 22 outside the reaction vessel 21 has the water vapor permeability, the water vapor may diffuse from the water vapor pipe 22 to the outside.

In FIG. 3, one water vapor pipe 22 is inserted into the reaction vessel 21, but a plurality of water vapor pipes 22 may be provided.

The cooling portion 23 has a function of cooling the water vapor pipe 22 outside the reaction vessel 21. A cooling temperature is not particularly limited as long as it is a temperature at which the water vapor in the water vapor pipe 22 can be liquefied. The water (the water vapor) cooled and liquefied by the cooling portion 23 is returned to the water electrolysis device 1 (refer to FIG. 2).

In the above-described hydrogen-oxygen reaction device 20, the mixed gas introduced into the reaction vessel 21 from the introduction portion 24 moves downward through the reaction region S filled with the reaction catalyst. During this time, hydrogen and oxygen in the mixed gas react with each other due to an action of the reaction catalyst, and the water vapor is generated. The water vapor generated in the reaction region S passes through the water vapor permeable membrane of the water vapor pipe 22 and moves into the water vapor pipe 22 as indicated by an arrow A in FIG. 3. Further, in the mixed gas in the reaction vessel 21, the amount of components different from the main component in the mixed gas decreases due to formation of the water vapor. Therefore, the gas (hydrogen or oxygen) in which the proportion of the main component is increased (the purity is increased) is discharged from the discharge portion 25 to the outside of the reaction vessel 21.

On the other hand, the water vapor introduced into the water vapor pipe 22 is cooled and liquefied by the cooling portion 23 and then discharged from the hydrogen-oxygen reaction device 20 to the outside. Since the proportion of the water vapor in the water vapor pipe 22 is reduced by discharging the liquefied water vapor to the outside, the water vapor generated in the reaction vessel 21 is again introduced into the water vapor pipe 22 through the water vapor permeable membrane. In this way, the water vapor pipe 22 is inserted into the reaction region S in the reaction vessel 21, and the water vapor generated in the reaction vessel 21 moves into the water vapor pipe 22 through the water vapor permeable membrane. Therefore, retention of the water vapor in the reaction vessel 21 can be inhibited.

Thus, according to the hydrogen-oxygen reaction device 20 according to the embodiment, the mixed gas of hydrogen and oxygen is introduced from the introduction portion 24, and the water vapor is formed from hydrogen and oxygen by the reaction catalyst in the reaction region S in the reaction vessel 21 and is then discharged from the discharge portion 25 to the outside. The proportion of the components different from the main component in hydrogen and oxygen contained in the mixed gas can be reduced by forming the water vapor in the reaction region S. Therefore, in the gas discharged from the discharge portion 25, the proportion of the components different from the main component is reduced. As described above, according to the hydrogen-oxygen reaction device 20, it is possible to remove appropriately one gas from the gas in which hydrogen and oxygen are mixed.

In the hydrogen-oxygen reaction device 20, the water vapor generated in the reaction region S can be discharged to the outside by the water vapor pipe 22 having the water vapor permeable membrane inserted into the reaction region S and the cooling portion 23. Therefore, the reaction efficiency between hydrogen and oxygen using the reaction catalyst in the reaction region S is improved.

Conventionally, as a method of removing one component from a mixed gas in which hydrogen and oxygen are mixed, a method of forming and removing water (water vapor) from hydrogen and oxygen using a reaction catalyst has been studied. However, it has been confirmed that simply forming and removing water vapor using a reaction catalyst does not remove components different from the main component sufficiently, and the purity of the main component may not be sufficiently increased. As the reason why separation of the two types of component is insufficient simply by forming of water using the reaction catalyst, for example, it is conceivable that the water vapor formed by the reaction between hydrogen and oxygen adheres to the reaction catalyst and thus the reaction catalyst is deactivated. On the other hand, in the hydrogen-oxygen reaction device 20 of the embodiment, it is possible to prevent the reaction catalyst in the reaction region S from being deactivated by having the configuration in which the water vapor is discharged from the reaction region S via the water vapor pipe 22 having the water vapor permeable membrane. Therefore, the reaction efficiency between hydrogen and oxygen when using the reaction catalyst is improved, and the removal of the components different from the main component can be performed with higher efficiency.

When the plurality of water vapor pipes 22 are inserted into the reaction vessel 21, since movement from the reaction region S to the water vapor pipe 22 is further promoted, it is possible to remove the components different from the main component with higher efficiency.

MODIFIED EXAMPLE

Figure 4:
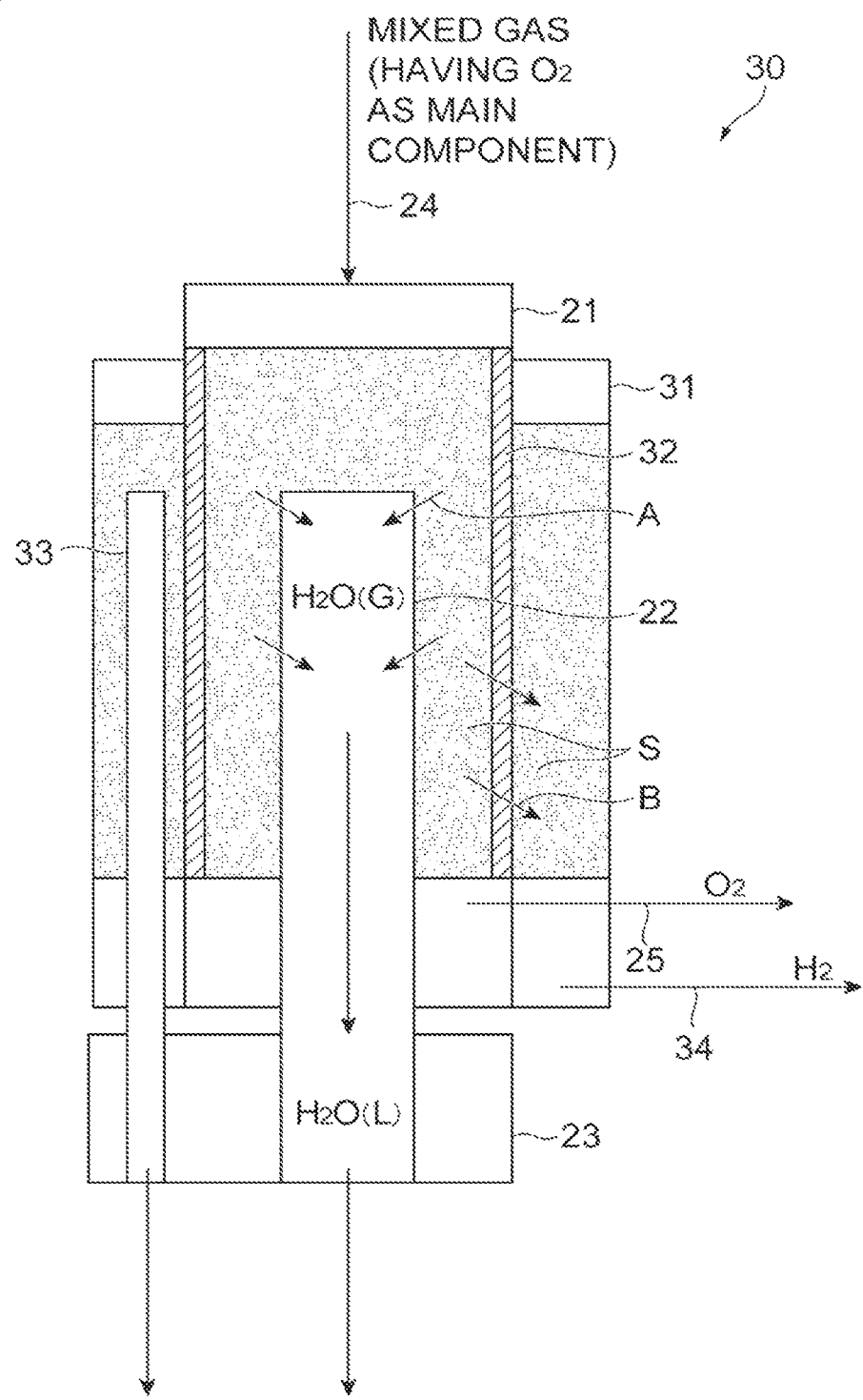
FIG. 4 is a diagram for explaining a configuration of a hydrogen-oxygen reaction device according to a modified example.

Next, a hydrogen-oxygen reaction device according to a modified example will be described with reference to FIG. 4. The hydrogen-oxygen reaction device 30 shown in FIG. 4 is different from the hydrogen-oxygen reaction device 20 shown in FIG. 3 in the following points. That is, in the hydrogen-oxygen reaction device 30, a second reaction vessel 31 is provided to surround the periphery of the reaction vessel 21. Additionally, the reaction vessel 21 and the second reaction vessel 31 are partitioned by a hydrogen selective permeable membrane 32.

In the hydrogen-oxygen reaction device 30, the periphery of the reaction region S of the reaction vessel 21 is configured of the hydrogen selective permeable membrane 32. The hydrogen selective permeable membrane 32 has a function of selectively transmitting hydrogen of hydrogen and oxygen. However, the hydrogen selective permeable membrane 32 may have oxygen permeability. That is, the hydrogen selective permeable membrane 32 is a membrane having a higher hydrogen permeability than oxygen permeability. However, a membrane having a larger difference between the oxygen permeability and the hydrogen permeability can be appropriately used as the hydrogen selective permeable membrane 32.

Also in the second reaction vessel 31 provided outside the hydrogen selective permeable membrane 32, a reaction region S (a second reaction region) is formed by the reaction catalyst. Further, a water vapor pipe 33 (a second water vapor pipe) having a water vapor permeable membrane is also inserted into the second reaction vessel 31. As in the water vapor pipe 22, at least a part of the region in contact with the reaction region S is formed by the water vapor permeable membrane. The number of the water vapor pipes 33 inserted into the second reaction vessel 31 can be changed as appropriate, as in the water vapor pipe 22.

Also, the cooling portion 23 of the hydrogen-oxygen reaction device 30 cools both the water vapor pipe 22 from the reaction vessel 21 and the water vapor pipe 33 from the second reaction vessel 31. Further, a discharge portion 34 (a second discharge portion) is also mounted on a lower portion of the second reaction vessel 31. The discharge portion 34 has a function of discharging a gas in the second reaction vessel 31 to the outside. The gas discharged from the discharge portion 34 is transported to a tank located at a subsequent stage. The cooling portion 23 may be provided individually for each of the water vapor pipes 22 and 31.

The hydrogen-oxygen reaction device 30 is appropriately used for removing hydrogen from the hydrogen-oxygen mixed gas having oxygen as the main component. Here, in the hydrogen-oxygen reaction device 30, it is assumed that the mixed gas having oxygen as the main component is introduced into the reaction vessel 21 from the introduction portion 24. The mixed gas introduced into the reaction vessel 21 moves downward through the reaction region S filled with the reaction catalyst. During this time, hydrogen and oxygen in the mixed gas react with each other due to the action of the reaction catalyst, and thus water vapor is formed. The water vapor generated in the reaction region S passes through the water vapor permeable membrane of the water vapor pipe 22 and moves into the water vapor pipe 22 as indicated by an arrow A in FIG. 4.

Further, in the mixed gas in the reaction vessel 21, components different from the main component in the mixed gas decrease due to the formation of the water vapor. Therefore, the gas (here, oxygen) in which the ratio of the main component is increased (the purity is increased) is discharged from the discharge portion 25 to the outside of the reaction vessel 21.

Further, as shown by an arrow B in FIG. 4, some of hydrogen and oxygen in the reaction vessel 21 moves from the reaction vessel 21 to the second reaction vessel 31 through the hydrogen selective permeable membrane 32. An amount of hydrogen in the gas passing through the hydrogen selective permeable membrane 32 is larger than that of oxygen. Therefore, there is a larger amount of hydrogen in the second reaction vessel 31, which is in a state in which hydrogen is in excess. Since the reaction region S is also formed in the second reaction vessel 31 due to the reaction catalyst, hydrogen and oxygen in the mixed gas react with each other due to the action of the reaction catalyst and become water vapor. The water vapor generated in the reaction region S passes through the water vapor permeable membrane of the water vapor pipe 33 inserted into the second reaction vessel 31 and moves into the water vapor pipe 33.

Further, in the mixed gas in the second reaction vessel 31, a component (here, oxygen) different from the main component of the mixed gas decreases due to the formation of the water vapor. Therefore, the gas (here, hydrogen) is discharged from the discharge portion 34 to the outside of the second reaction vessel 31 in a state in which the proportion of the main component is increased (the purity is increased).

The water vapor introduced into the water vapor pipes 22 and 33 is cooled and liquefied by the cooling portion 23 and then discharged from the hydrogen-oxygen reaction device 30 to the outside. Since the liquefied water vapor is discharged to the outside and thus a proportion of the water vapor in the water vapor pipes 22 and 33 is reduced, the water vapor generated again in the reaction vessel 21 and the second reaction vessel 31 is introduced into the water vapor pipes 22 and 33 through the water vapor permeable membrane. As described above, since the water vapor pipes 22 and 33 are inserted into both the reaction vessel 21 and the second reaction vessel 31, the water vapor moves into the water vapor pipes 22 and 33 through the water vapor permeable membrane. Therefore, the retention of the water vapor in the reaction vessel 21 and the second reaction vessel 31 can be suppressed.

In the hydrogen-oxygen reaction device 30, the second reaction vessel 31 in which the gas in the reaction vessel 21 can move is provided, and the hydrogen selective permeable membrane 32 is provided between the reaction vessel 21 and the second reaction vessel 31. Therefore, the hydrogen component in the reaction vessel 21 moves to the second reaction vessel 31. Then in the reaction vessel 21, the proportion of the oxygen component is increased compared with the introduced mixed gas. When the hydrogen-oxygen mixed gas having oxygen as the main component is introduced into the reaction vessel 21, the proportion of the main component is increased. When the water vapor is formed by the reaction between hydrogen and oxygen due to the reaction catalyst in the reaction region S in a state in which the proportion of the oxygen component is increased in this way, hydrogen is effectively removed from the gas discharged from the discharge portion 25. Therefore, the gas in which the proportion of the oxygen component is further increased is discharged from the discharge portion 25. As described above, according to the hydrogen-oxygen reaction device 30, when the hydrogen-oxygen mixed gas having oxygen as the main component is introduced into the reaction vessel 21, the purity of oxygen in the gas discharged from the lower discharge portion 25 is further increased as compared with the hydrogen-oxygen reaction device 20.

In the above-described hydrogen-oxygen reaction device 30, a hydrogen selective permeable membrane 32 is provided at a boundary between the reaction vessel 21 and the second reaction vessel 31 to increase the purity of oxygen discharged from the discharge portion 25 when the hydrogen-oxygen mixed gas having oxygen as the main component is introduced. Additionally, a configuration in which hydrogen is preferentially moved with respect to the second reaction vessel 31 is adopted. However, when a permeable membrane which can selectively allow oxygen to permeate therethrough is mounted instead of the hydrogen selective permeable membrane 32, a configuration opposite to the above can be realized. Specifically, the permeable membrane which can selectively allow oxygen to permeate therethrough is provided between the reaction vessel 21 and the second reaction vessel 31 to increase a purity of hydrogen discharged from the discharge portion 25 when the hydrogen-oxygen mixed gas having hydrogen as the main component is introduced. With such a configuration, it is possible to realize a configuration in which oxygen is preferentially moved from the reaction vessel 21 to the second reaction vessel 31. Therefore, the purity of hydrogen discharged from the discharge portion 25 can be increased.

In the hydrogen-oxygen reaction device 30, although the case in which the second reaction vessel 31 is provided around the reaction vessel 21 has been described, the reaction vessel 21 and the second reaction vessel 31 may be connected to each other via the hydrogen selective permeable membrane 32, and a positional relationship between the reaction vessel 21 and the second reaction vessel 31 is not particularly limited. For example, a configuration in which the reaction vessel 21 and the second reaction vessel 31 are disposed adjacent to each other may be adopted. Further, shapes of the reaction vessel 21 and the second reaction vessel 31 may be appropriately changed.

Further, in the hydrogen-oxygen reaction device 30, although the case in which the hydrogen selective permeable membrane 32 is provided on the entire surface around the reaction region S in the reaction vessel 21 has been described, the hydrogen selective permeable membrane 32 does not need to be provided on the entire surface around the reaction region S in the reaction vessel 21. As described above, the hydrogen selective permeable membrane 32 has a function of selecting and separating hydrogen from the mixed gas introduced into the reaction vessel 21. Therefore, the hydrogen selective permeable membrane 32 can appropriately perform separation of hydrogen when it is provided closer to the introduction portion 24 than to the discharge portion 25 is, and thus the purity of oxygen discharged from the discharge portion 25 can be appropriately increased.

Although the embodiments of the present disclosure have been described above, the present disclosure is not limited to the above-described embodiments, and various changes can be made. For example, in the hydrogen-oxygen reaction device, although the case in which the introduction portion 24 is located above the reaction region S and the discharge portion 25 is located below the reaction region S has been described, the arrangement of the introduction portion 24 and the discharge portion 25 with respect to the reaction vessel 21 is not particularly limited. However, when the introduction portion 24 is provided at one end portion of the reaction region S and the discharge portion 25 is provided at the other end portion on the side opposite to the one end portion of the reaction region S, the gas which has passed through the reaction region S can be discharged from the discharge portion 25, and thus the gas of which a purity is increased by the formation of the water vapor can be discharged from the discharge portion 25.

Further, the shapes of the water vapor pipes 22 and 33 can be changed as appropriate. In the above-described embodiment, although the case in which the water vapor pipes 22 and 33 have shapes that extend in a vertical direction has been described, for example, the shape of the water vapor pipe may be changed to increase an area facing the reaction region in the water vapor permeable membrane provided in the water vapor pipe 22.

As described above, the configuration of the hydrogen-oxygen reaction devices 20 and 30 described in the above embodiment can be changed as appropriate.

Further, the hydrogen-oxygen reaction devices 20 and 30 may be used for an application different from the separation of hydrogen and oxygen in the subsequent stage of the water electrolysis device in the above-described regenerative fuel cell system.

INDUSTRIAL APPLICABILITY

According to the hydrogen-oxygen reaction device of the present disclosure, gases which are components different from a main component can be appropriately removed from a hydrogen-oxygen mixed gas having hydrogen or oxygen as the main component.

REFERENCE SIGNS LIST

1 Water electrolysis device
6 Hydrogen tank
7 Oxygen tank
11, 12 Gas-liquid separation device
20, 20A, 20b, 30 Hydrogen-oxygen reaction device
21 Reaction vessel
22 Water vapor pipe
23 Cooling portion
24 Introduction portion
25 Discharge portion 31 Second reaction vessel
32 Hydrogen selective permeable membrane
33 Water vapor pipe (second water vapor pipe)
34 Discharge portion (second discharge portion)
S Reaction region

The invention claimed is:

1. A hydrogen-oxygen reaction device comprising:
   a reaction vessel including a reaction region filled with a reaction catalyst which promotes a reaction between hydrogen and oxygen;
   an introduction portion configured to introduce an hydrogen-oxygen mixed gas having hydrogen or oxygen as a main component into the reaction vessel;
   a water vapor pipe of which one end portion is inserted into the reaction vessel and including a region in contact with the reaction region with at least a part of the region in contact with the reaction region being formed of a water vapor permeable membrane;
   a discharge portion through which a gas in the reaction vessel is discharged to an outside; and
   a cooling portion configured to cool the water vapor pipe outside the reaction vessel.

2. The hydrogen-oxygen reaction device according to claim 1, wherein the introduction portion is provided at one end portion of the reaction region, and the discharge portion is provided at the other end portion on a side opposite to the one end portion of the reaction region.

3. The hydrogen-oxygen reaction device according to claim 1, wherein a plurality of water vapor pipes are inserted into the reaction vessel.

4. The hydrogen-oxygen reaction device according to claim 2, wherein a plurality of water vapor pipes are inserted into the reaction vessel.

5. The hydrogen-oxygen reaction device according to claim 1, further comprising:
   a second reaction vessel having a second reaction region filled with the reaction catalyst;
   a hydrogen selective permeable membrane provided at a boundary between the reaction vessel and the second reaction vessel;
   a second water vapor pipe of which one end portion is inserted into the second reaction vessel and which includes a region in contact with the second reaction region with at least a part of the region in contact with the second reaction region being formed of a water vapor permeable membrane; and
   a second discharge portion configured to discharge a gas in the second reaction vessel to an outside,
   wherein the cooling portion cools the second water vapor pipe outside the second reaction vessel.

6. The hydrogen-oxygen reaction device according to claim 2, further comprising:
   a second reaction vessel having a second reaction region filled with the reaction catalyst;
   a hydrogen selective permeable membrane provided at a boundary between the reaction vessel and the second reaction vessel;
   a second water vapor pipe of which one end portion is inserted into the second reaction vessel and which includes a region in contact with the second reaction region with at least a part of the region in contact with the second reaction region being formed of a water vapor permeable membrane; and
   a second discharge portion configured to discharge a gas in the second reaction vessel to an outside,
   wherein the cooling portion cools the second water vapor pipe outside the second reaction vessel.

7. The hydrogen-oxygen reaction device according to claim 3, further comprising:
   a second reaction vessel having a second reaction region filled with the reaction catalyst,
   a hydrogen selective permeable membrane provided at a boundary between the reaction vessel and the second reaction vessel;
   a second water vapor pipe of which one end portion is inserted into the second reaction vessel and which includes a region in contact with the second reaction region with at least a part of the region in contact with the second reaction region being formed of a water vapor permeable membrane; and
   a second discharge portion configured to discharge a gas in the second reaction vessel to an outside,
   wherein the cooling portion cools the second water vapor pipe outside the second reaction vessel.

8. The hydrogen-oxygen reaction device according to claim 4, further comprising:
   a second reaction vessel having a second reaction region filled with the reaction catalyst;
   a hydrogen selective permeable membrane provided at a boundary between the reaction vessel and the second reaction vessel;
   a second water vapor pipe of which one end portion is inserted into the second reaction vessel and which includes a region in contact with the second reaction region with at least a part of the region in contact with the second reaction region being formed of a water vapor permeable membrane; and
   a second discharge portion configured to discharge a gas in the second reaction vessel to an outside,
   wherein the cooling portion cools the second water vapor pipe outside the second reaction vessel.

9. The hydrogen-oxygen reaction device according to claim 1 which is used in a regenerative fuel cell system.

10. The hydrogen-oxygen reaction device according to claim 1 which is used in a regenerative fuel cell system mounted in an aircraft.

* * * * *